(12) United States Patent
Chang

(10) Patent No.: US 7,404,413 B2
(45) Date of Patent: Jul. 29, 2008

(54) FAUCET STRUCTURE

(76) Inventor: Kim Chang, No. 8, An Lin Rd., Hsin Tun Dist., Taichung City (TW)

( * ) Notice: Subject to any disclaimer, the term of this patent is extended or adjusted under 35 U.S.C. 154(b) by 244 days.

(21) Appl. No.: 11/440,467

(22) Filed: May 25, 2006

(65) Prior Publication Data

US 2007/0272312 A1 Nov. 29, 2007

(51) Int. Cl.
*F16K 11/22* (2006.01)
(52) U.S. Cl. .......................... 137/606; 4/676; 137/359; 137/801
(58) Field of Classification Search ................ 137/597, 137/606, 359, 801; 4/676, 696
See application file for complete search history.

(56) References Cited

U.S. PATENT DOCUMENTS

| | | | | |
|---|---|---|---|---|
| 3,911,946 A | * | 10/1975 | Humpert et al. ............. | 137/359 |
| 5,669,417 A | * | 9/1997 | Lian-Jie ....................... | 137/801 |
| 5,746,244 A | * | 5/1998 | Woolley et al. .............. | 137/359 |
| 7,231,936 B2 | * | 6/2007 | Chang ......................... | 137/328 |
| 2004/0154673 A1 | * | 8/2004 | Mascari et al. ............... | 137/801 |

* cited by examiner

*Primary Examiner*—Stephen M Hepperle
(74) *Attorney, Agent, or Firm*—Troxell Law Office, PLLC

(57) ABSTRACT

A faucet structure comprises a valve body having outlet sleeves, accommodating tubes, and inlet connecting pipes to be mounted between a panel equipped with a passage, bores, a clearance recess, and through holes, and a cover having a set of holes. The middle section of the valve body is disposed a connecting tube having a set of coupling ends each joined to one outlet sleeve, and an assembly section to fit to an outlet duct of a water supply seat. The valve body also has a water-flow control valve received into the accommodating tube to match to a handle seat with a grip attached thereto. The water supply seat formed by a set of upper and lower housings assembled to each other to enclose the outlet duct therein is mounted to the middle section of the panel thereon. Therefore, the present invention can achieve easy and flexible assembly thereby.

10 Claims, 10 Drawing Sheets

FAUCET STRUCTURE

BACKGROUND OF THE INVENTION

The present invention relates to a faucet structure wherein the faucet is molded of plastic material that can be freely processed and flexibly mixed in various colors without the complicated steps such as polishing, burnishing and lacquering, economically reducing the cost of material and production thereby. Besides, the faucet includes a valve body with a connecting tube detachably mounted thereto so that a user can easily assemble or dismantle the valve body as desired, facilitating the convenience and flexibility of the present invention in application.

Please refer to FIG. 1 showing an exploded perspective view of a conventional faucet structure. A conventional faucet 10 includes a panel 11, a cover 12, and an integrally molded H-shaped valve body 13 that, having a control valve 131 received at both sides therein respectively, is mounted between the panel 11 and the cover 12 thereof. The middle section of the valve body 13 has a flow duct 132 with a coupling tube 133 protruding thereon, and each control valve 131 of the valve body 13 is fitted to a handle seat 14 at one side thereof. An outlet seat 15 is provided with an inlet duct 151 and an outlet duct 152, and the inlet duct 151 thereof is joined to the coupling tube 133 of the flow duct 132 at one side to complete the assembly of the faucet 10.

There are some drawbacks to the conventional faucet above. First, the faucet 10 is integrally molded, which not only makes it difficult to assemble or dismantle, but can increase the burden to a washbasin due to its heavy weight in application. Second, the faucet 10 is made of metallic material, and the remains of toxic metallic material thereof tend to mix into the water flow, posing potential danger to users in daily life. Third, the assembly parts of the control valve 131 thereof are numerous and complicated, which can increase the costs of material and processing as well as augmenting the difficulty of assembly and maintenance thereof. Fourth, in the manufacturing process thereof, the internal surface of the faucet 10 is made in a rather rough surface as shown in FIGS. 2, 3 wherein the expanded pores of the internal surface thereof can easily detain the deposits in the water flow and make the ducts get blocked out of use in the long run. Besides, the valve body 13 is fixedly mounted onto the faucet 10, which makes the replacement or maintenance of the faucet 10 rather difficult and time-consuming.

SUMMARY OF THE PRESENT INVENTION

It is, therefore, the primary purpose of the present invention to provide a faucet structure wherein the faucet is molded of plastic material so that the assembly parts manufactured thereby can have smooth surfaces with fine and tightened pores defining thereon, avoiding the risk of toxic metallic material remained therein as well as facilitating smooth transportation of the water flow without the limescale deposited therein so as to achieve the state of clean and save application thereby.

It is, therefore, the second purpose of the present invention to provide a faucet structure wherein the faucet is molded of plastic material that can be freely processed and flexibly mixed in various colors without the complicated steps such as burnishing, polishing, and lacquering, reducing the cost of material and production to boost the economical efficiency thereby.

It is, therefore, the third purpose of the present invention to provide a faucet structure wherein the faucet has a connecting tube equipped with coupling ends at both sides and detachably mounted to a valve body to form a collapsible-type assembly so that a user can freely dismantle the valve body for cleaning or replacement, reducing the weight of the faucet on the washbasin for more durable use and augmenting the convenience and flexibility of the present invention in application.

DETAILED DESCRIPTION OF THE PREFERRED EMBODIMENTS

Figure 1:
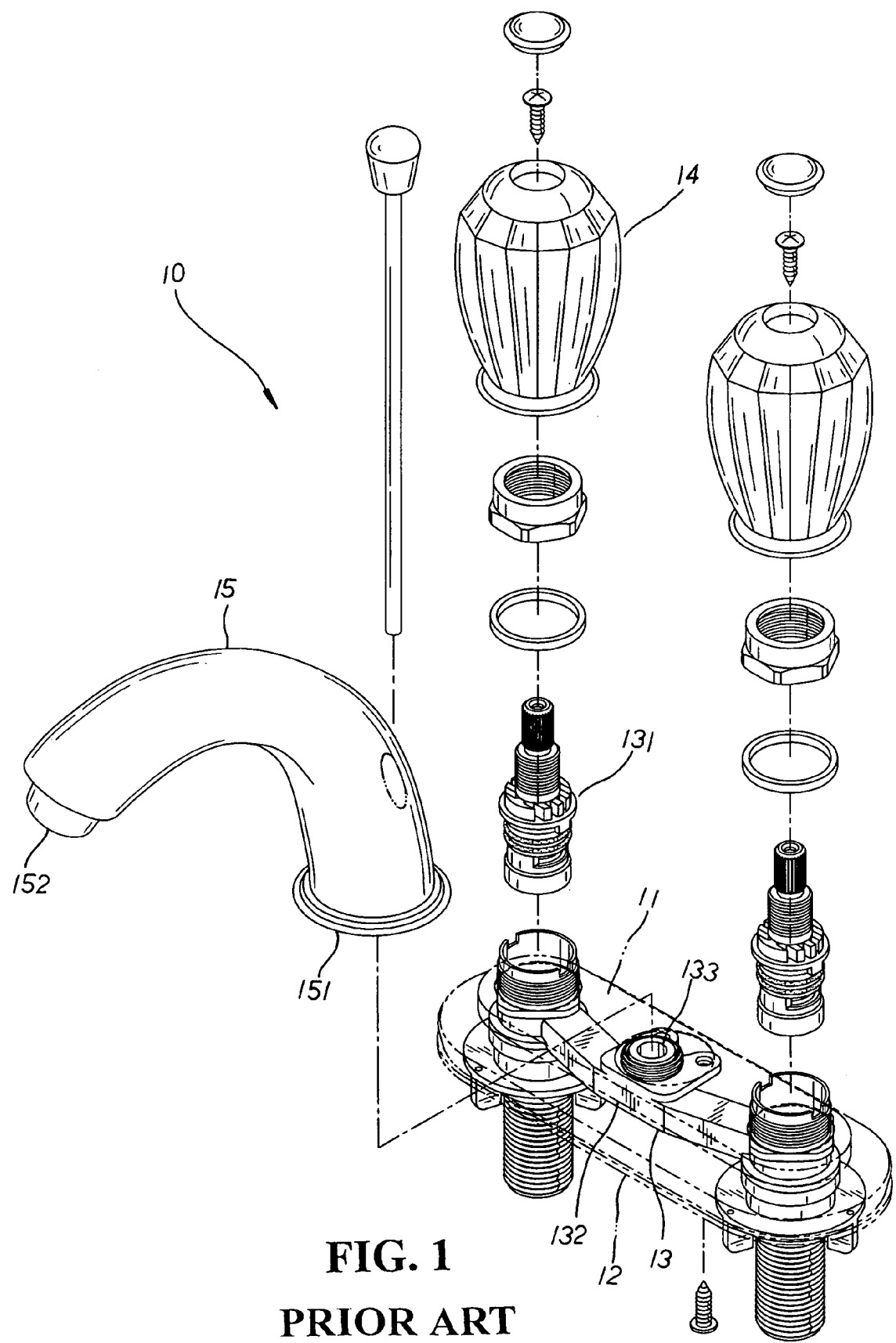
FIG. 1 is an exploded perspective view of a conventional faucet structure.
Figure 2:
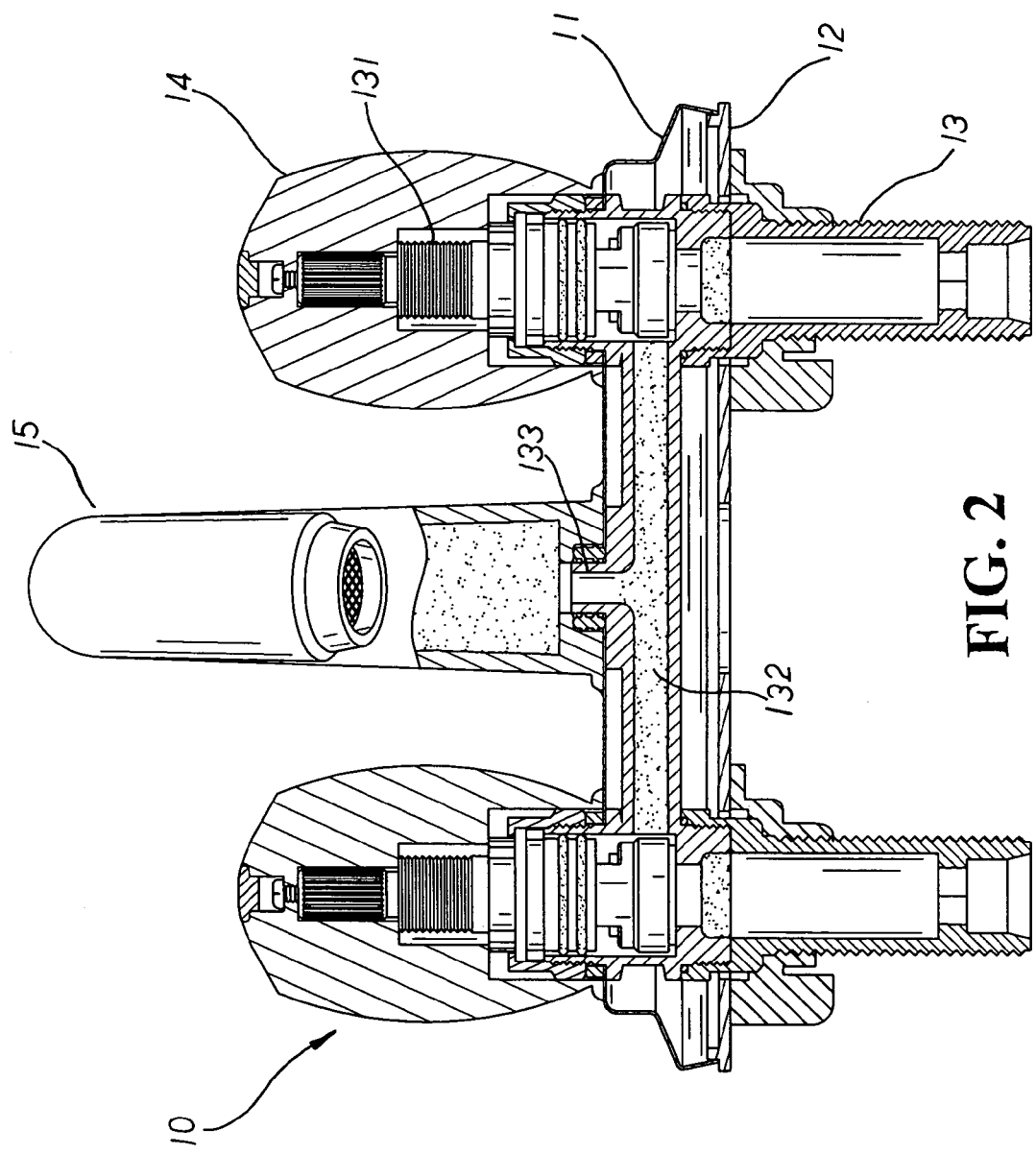
FIG. 2 is an assembled cross sectional view of the conventional faucet structure.
Figure 3:
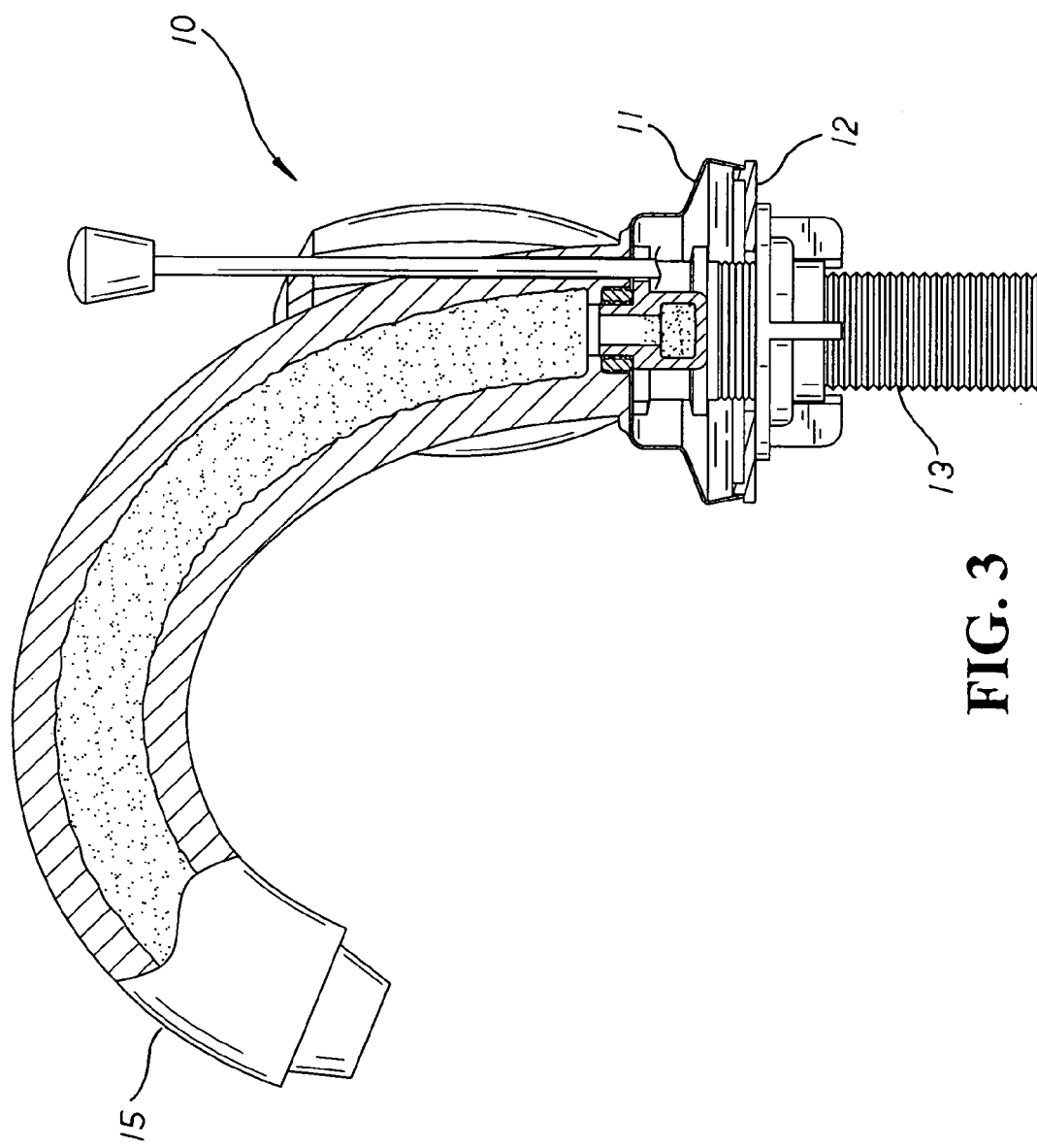
FIG. 3 is another assembled cross sectional view of the conventional faucet structure.
Figure 4:
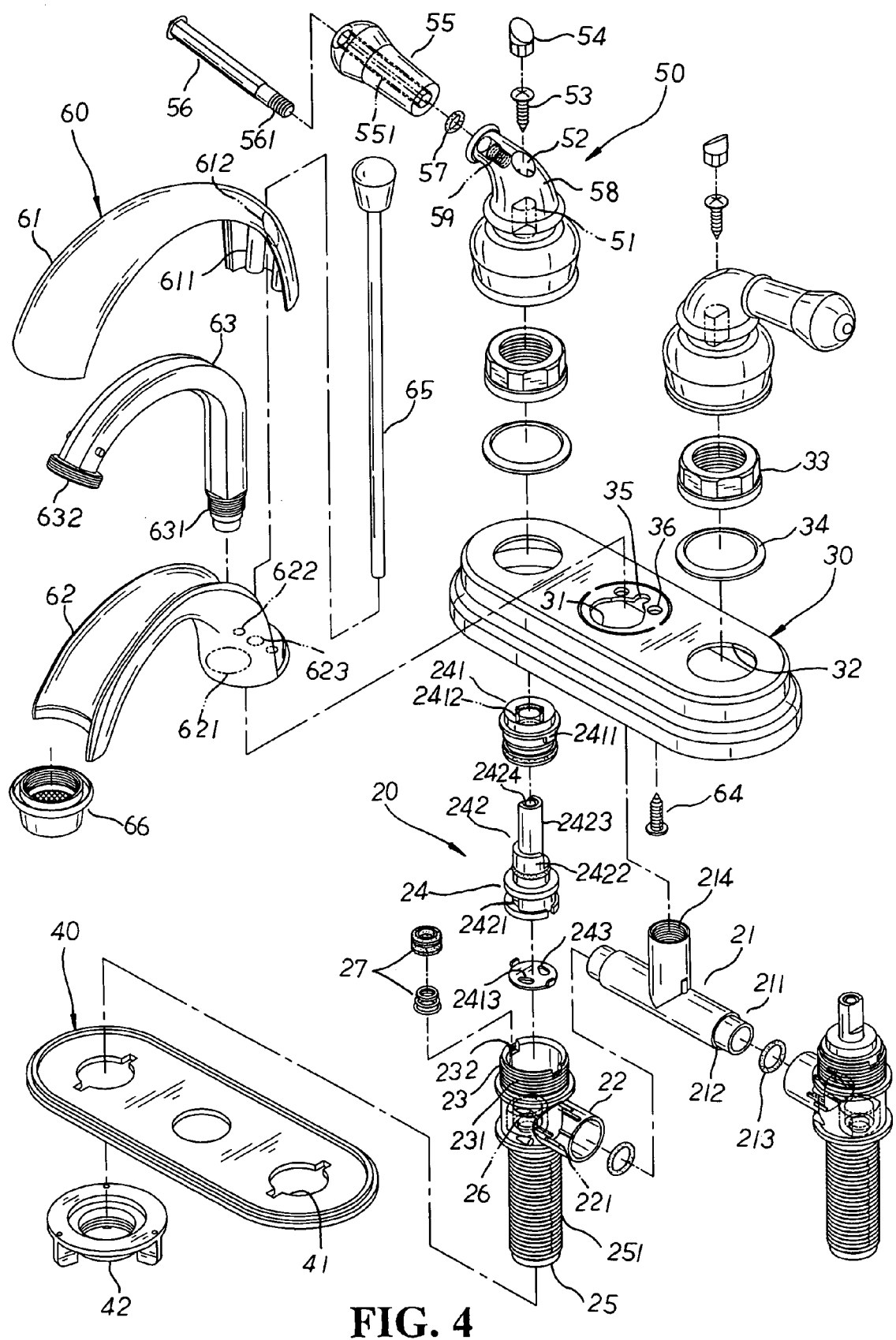
FIG. 4 is an exploded perspective view of the present invention.

Please refer to FIG. 4 showing an exploded perspective view of the present invention. The present invention relates to a faucet structure, comprising a faucet molded of high/low-temperature resistant plastic material and equipped with an H-shaped valve body 20 wherein a connecting tube 21 is detachably mounted to the middle section of the valve body 20. The connecting tube 21 has a pair of coupling ends 211 protruding at both end sides thereon, and each coupling end 211, having a stop surface 212 defining thereon for the mounting of a sealing ring 213 thereon, is joined to an outlet sleeve 22 disposed at both lateral sides of the valve body 20 respectively. The inner surface of the outlet sleeve 22 has multiple ribs 221 annularly arranged in spacing thereon so that the sealing ring 213 is precisely pressed by the stop surface 212 and restricted in position by the ribs 221 there-between. Besides, both ends of the outlet sleeve 22 are respectively joined to an accommodating tube 23 with an external-threaded fixing section 231 defining thereon, and an inlet connecting pipe 25 having external-threaded locking section 251 defining thereon. Besides, an assembly section 214 defined by an internal-threaded hole therein is provided protruding in the middle section of the connecting tube 21 to correspond to a passage 31 disposed in the middle section of a panel 30 and fluidly connect to both coupling ends 211 disposed at both sides thereof. A water-flow control valve 24 is mounted to the interior of the accommodating tube 23 therein. The water-flow control valve 24 is made up of a collar 241 that, having a set of protrusions 2411 symmetrically protruding thereon, is mounted onto an adjusting element 242 having guide orifices 2421 defining thereon, permitting a first limiting plate 2412, and a second limiting plate 2422 respectively extending at a preset position of the collar 241 and the adjusting element 242 thereon to precisely contact and abut against each other thereby. Besides, the protrusions 2411 of the collar 241 are corresponded to a set of insert grooves 232 cut at the accommodating tube 23 thereon. A guide piece 243 with apertures 2431 disposed thereon is attached to one side of the adjusting element 242, corresponding to the guide orifices 2421 thereof. The conjoining section of the inlet connecting pipe 25 and the accommodating tube 23 is disposed a port 26 for the accommodation of a flexible watertight ring 27 corresponding to the apertures 2431 of the guide piece 243 thereby. The panel 30 has a set of bores 32 symmetrically arranged adjacent to both sides of the passage 31 each for the extension of the accommodating tube 23 of the valve body 20 there-through, permitting the external-threaded fixing section 231 to secure onto an internal-threaded locking element 33 and a washer 34 and firmly fix onto the panel 30 thereby. A cover 40 equipped with holes 41 corresponding to the bores 32 of the panel 30 is provided for the extension of the inlet connecting pipe 25 there-through, permitting the external-threaded locking section 251 to lock to an internal-threaded locking element 42 and secure onto the cover 40 thereby. The adjusting element 242 is also equipped with a shaft 2423 defined by an internal-threaded hole 2424 to be inserted to a handle seat 50 with a positioning groove 51 disposed therein. A connection portion 58 is disposed corresponding to the positioning groove 51 with a guiding hole 52 defining thereon for the extension of a screw 53 guided to lock onto the internal-threaded hole 2424 and stopped by an ornamental element 54 on top thereof. The connection portion 58, bent in an arched shape, is equipped with an inner-threaded screw hole 59 indented at one side therein. A grip 55, ended in a crown-like shape at one side and tapered into a cylindrical configuration at the other thereof, is provided with a fitting hole 551 extending there-through for the mounting of an insert element 56 with an outer-threaded fitting end 561 protruding thereon. The insert element 56 extending through the fitting hole 551 is guided through a watertight O-ring 57 till the outer-threaded fitting end 561 being secured to the inner-threaded screw hole 59 of the connection portion 58 thereof. The passage 31 of the panel 30 has a clearance recess 35 cut at an appropriate position of one side thereof, and a set of through holes 36 adjacent to the clearance recess 35 at both sides thereon. A set of upper and lower housings 61, 62 is provided to enclose an outlet duct 63 therein and form a water supply seat 60 therewith wherein the outlet duct 63 is correspondingly molded in an arcuate hooked shape to fit to the curvature of the upper and lower housings 61, 62 thereby. The upper housing 61 has a pair of internal-threaded locating posts 611 symmetrically protruding at the appropriate positions of one side thereon with a lift rod hole 612 extending in the middle section there-between. The lower housing 62 has an opening 621, two screw holes 622, and a clearance hole 623 appropriately preset at the seat surface thereon to correspond to the panel 30 thereby. Both ends of the outlet duct 63 are respectively equipped with an external-threaded locking portion 631, 632, permitting the locking portion 631 to extend through the opening 621 and the passage 31 of the lower housing 62 and the panel 30 respectively and secure to the assembly section 214 of the connecting tube 21 thereof. Then, the upper and lower housings 61, 62 are reciprocally joined to each other, permitting the locating posts 611 to correspondingly match to the screw holes 622, and a screw 64 guided through the through hole 36 and the screw hole 622 of the panel 30 and the lower housing 62 in turn is applied to lock to the locating posts 611 respectively. Meanwhile, the lift rod hole 612 of the upper housing 61 is correspondingly aligned with the clearance hole 623 of the lower housing 62 and the clearance recess 35 of the panel 30 for the extension of a lift rod 65 there-through. The locking portion 632 defining the other end of the outlet duct 63 is secured to an internal-threaded nozzle 66 and located to the conjoining end edge of the upper and lower housings 61, 62 thereon.

Figure 5:
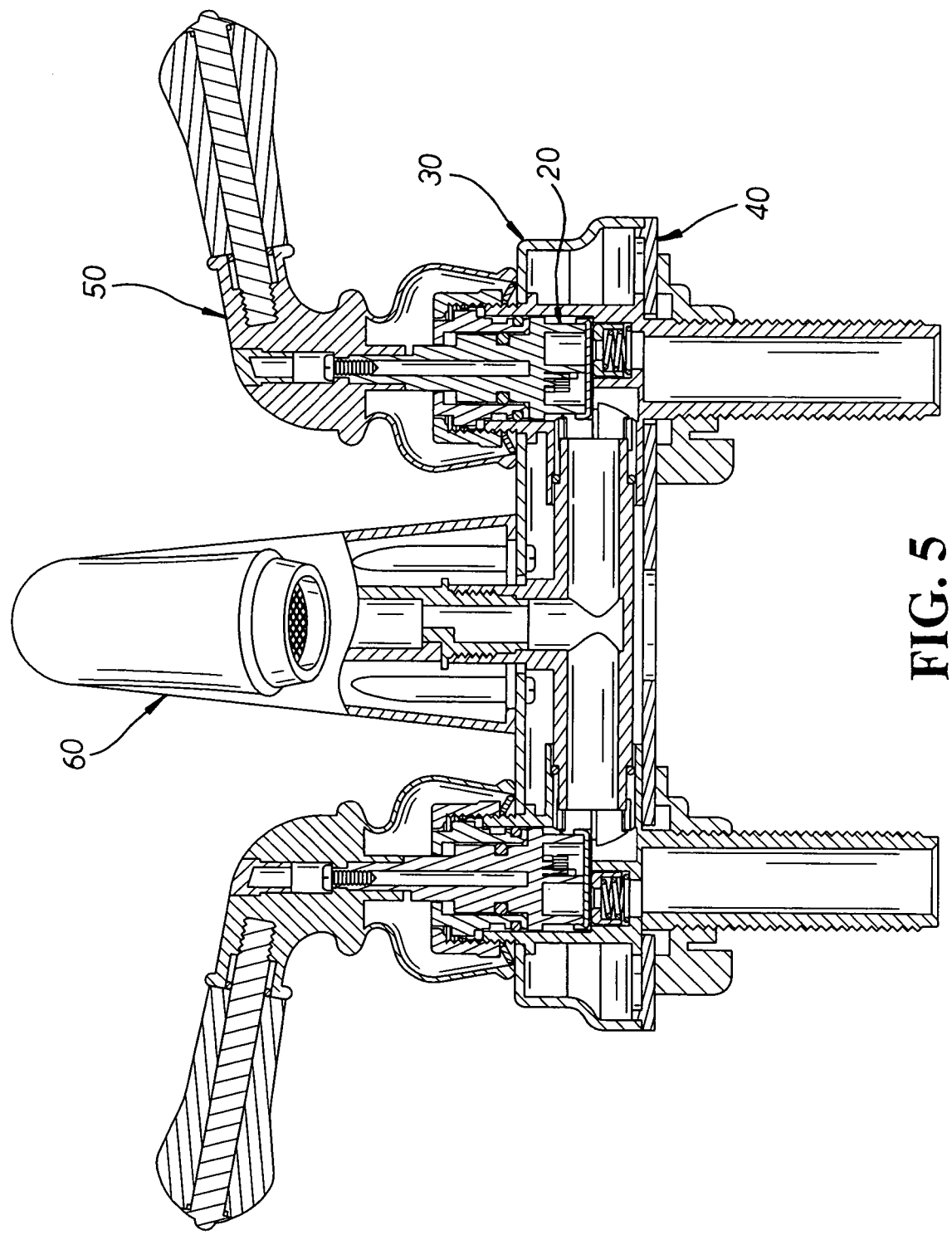
FIG. 5 is an assembled cross sectional view of the present invention.
Figure 6:
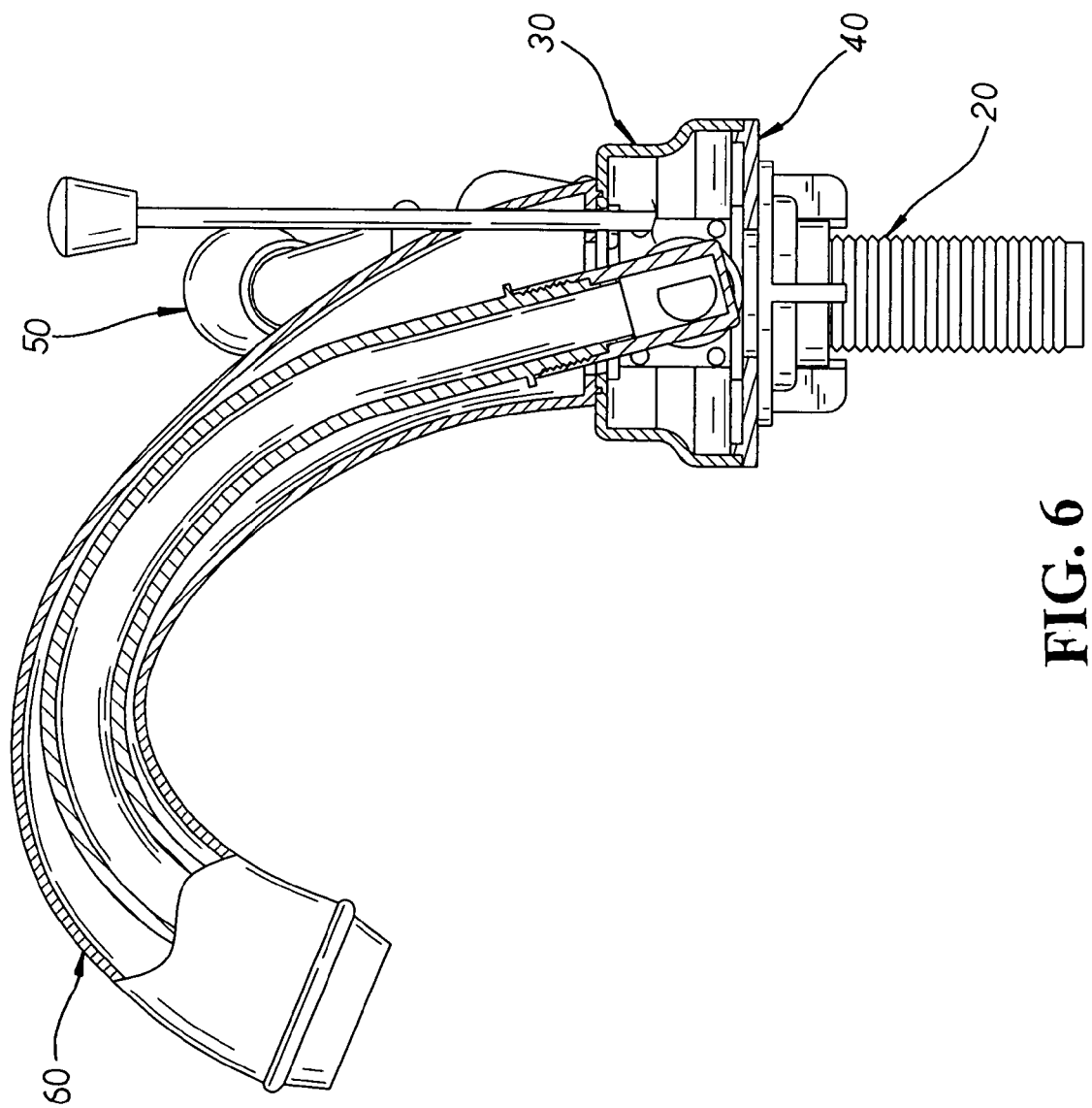
FIG. 6 is another assembled cross sectional view of the present invention.

Please refer to FIG. 5 showing an assembled cross sectional view of the present invention (accompanied by FIG. 6). The faucet is molded of plastic material that can be processed to provide assembly parts defined by smooth and glide inner and outer surfaces so that limescale won't get deposited thereon and the hygiene of the faucet can be maintained for safe application thereby. In addition, the connecting tube 21 is detachably mounted to the valve body 20 to provide a collapsible-type assembly so that a user can freely dismantle or assemble the faucet as desired, augmenting the convenience and flexibility of the present invention in application. Furthermore, the plastic material utilized in the present invention can also omit the complicated processing steps such as polishing, burnishing and lacquering as found in the manufacturing of the conventional faucets, economically reducing the cost of production thereby.

Figure 7:
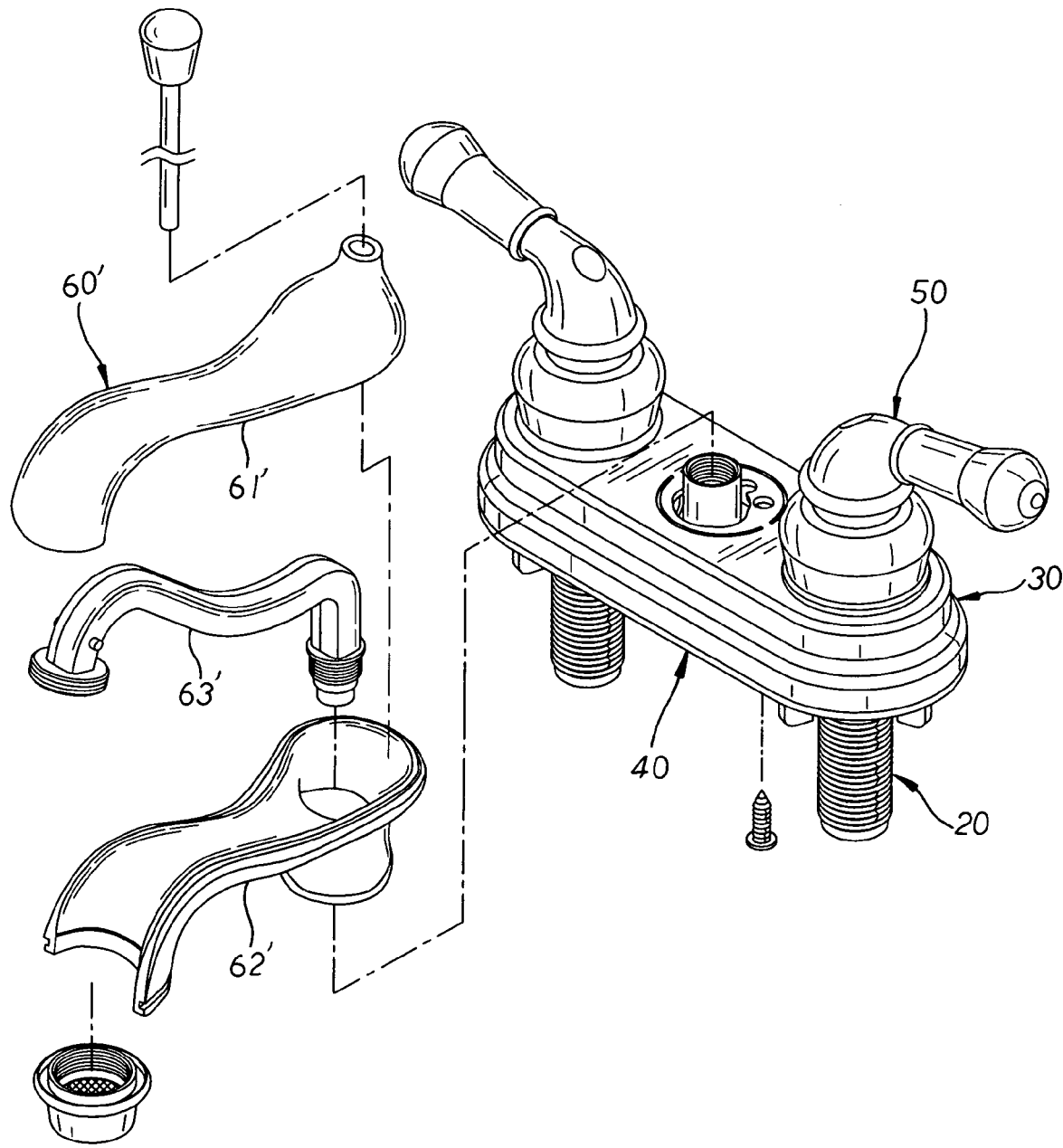
FIG. 7 is an exploded perspective view of another embodiment of the present invention.
Figure 8:
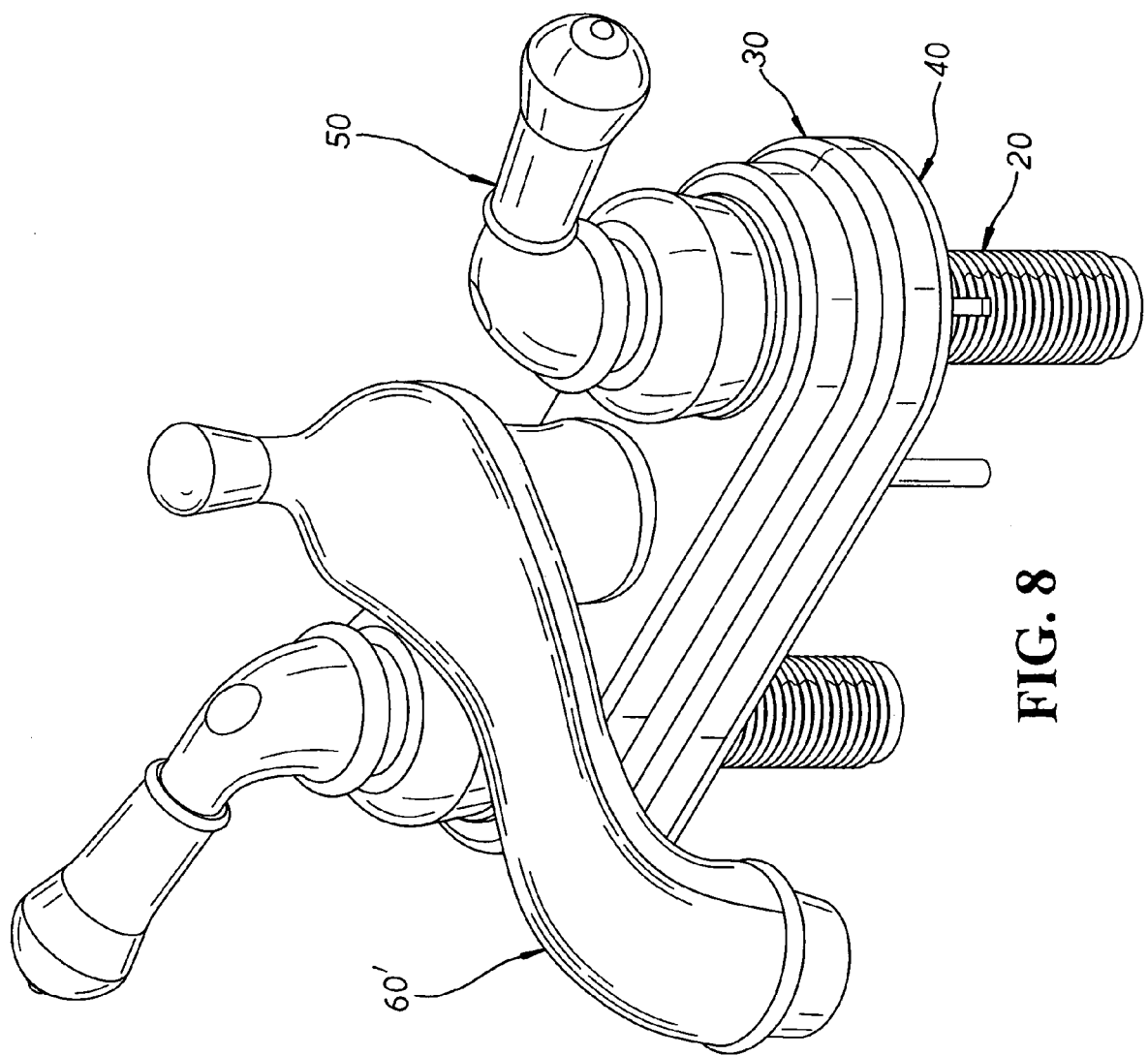
FIG. 8 is an assembled perspective view of another embodiment of the present invention.
Figure 9:
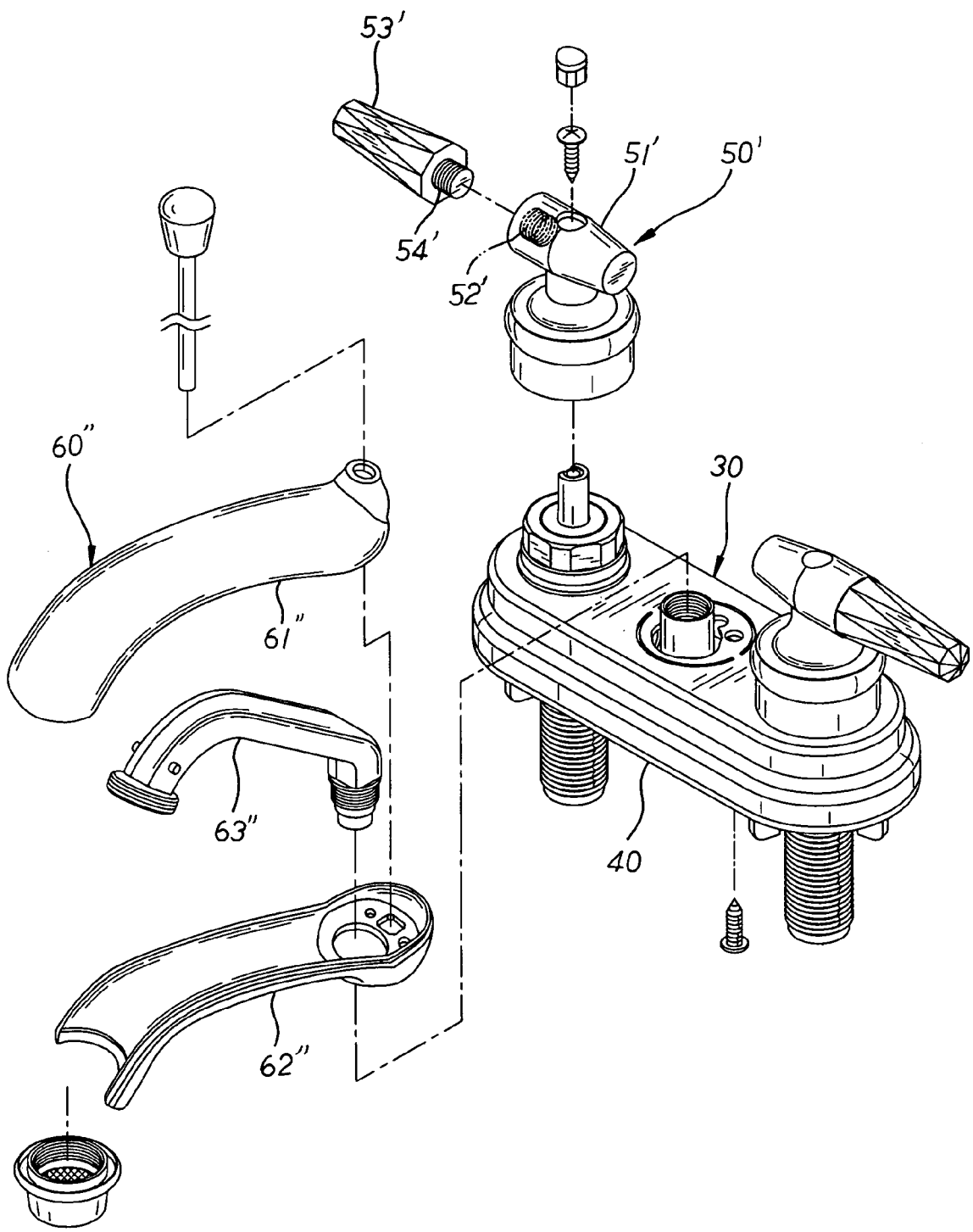
FIG. 9 is an exploded perspective view of a third embodiment of the present invention.
Figure 10:
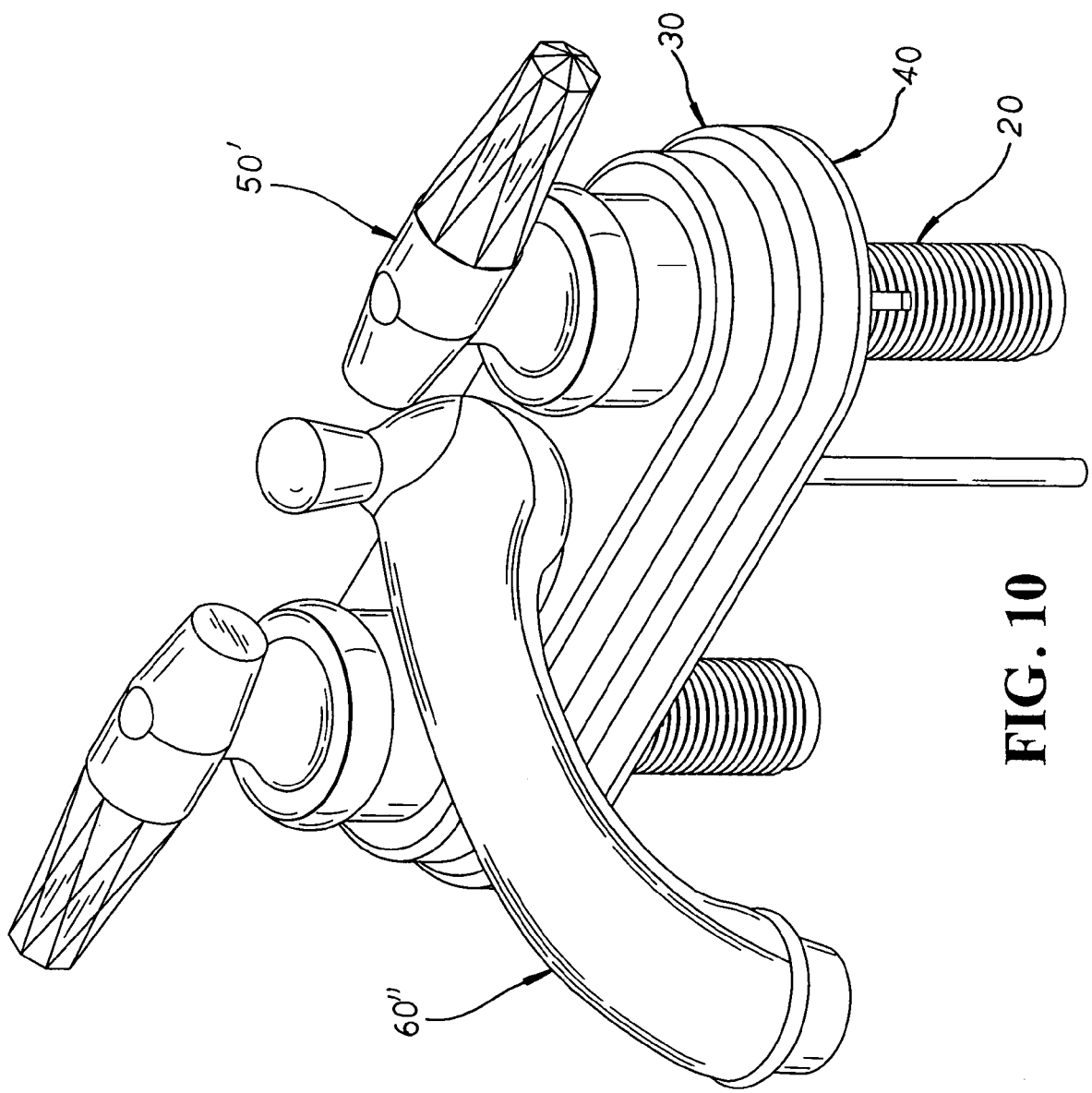
FIG. 10 is an assembled perspective view of the third embodiment of the present invention.

Please refer to FIG. 7 showing an exploded perspective view of another embodiment of the present invention (accompanied by FIG. 8). The present invention can also include a water supply seat 60' equipped with an outlet duct 63' corresponding to a set of upper and lower housings 61', 62', in shape and bent to extend in consecutive concave/convex curvatures in a lamp-like configuration Please refer to FIG. 9 showing an exploded perspective view of a third embodiment of the present invention (accompanied by FIG. 10). The present invention can also comprise a water supply seat 60" having an outlet duct 63" that, shaped to correspond to a set of upper and lower housings 61", 62", is curved into an inverted pipe-like configuration. Besides, a handle seat 50' is equipped with a T-shaped connection portion 51' having an internal-threaded screw hole 52' defining one end therein, and a tapered grip 53' having multiple different-angled and diamond-shaped facets cut at the circumferential surface thereon and an external-threaded screw section 54' protruding at one end thereon, permitting the internal-threaded screw hole 52' of the connection portion 51' to secure to the external-threaded screw section 54' thereof.

What is claimed is:

1. A faucet structure, comprising a faucet molded of high/low-temperature resistant plastic material wherein the faucet has a valve body with a connecting tube detachably mounted to the middle section thereon to form a collapsible-type assembly thereby, and the connecting tube, equipped with a set of coupling ends and an assembly section thereon, has an outlet sleeve joined to both coupling ends respectively; both end sides of each outlet sleeve are respectively coupled with an accommodating tube with a water-flow control valve received therein, and an inlet connecting pipe in mutual communication therewith; a panel is equipped with a set of bores disposed at both sides for the extension of the accommodating tubes there-through respectively, and a passage for the mounting of the assembly section of the connecting tube therethrough; the panel also includes a clearance recess for the extension of a lift rod there-through, and a set of through holes for the fixing of screws therewith; a cover equipped with a set of holes corresponding to the bores of the panel is situated opposite to the panel for the extension of the inlet connecting pipe there-through; thus, the valve body is retained in place between the panel and the cover, permitting the accommodating tubes and the inlet connecting pipes to extend outwards and respectively secure to a locking element for firm location thereby; a handle seat equipped with a grip is mounted to one side of the water-flow control valve; an upper housing equipped with locating posts and a lift rod hole is reciprocally engaged with a lower housing equipped with an opening, screw holes, and a clearance hole to enclose an outlet duct therein and form a water supply seat corresponding to the passage, the clearance recess, and the through holes of the panel, and the assembly section of the connecting tube for assembly thereof; via the aforementioned structure, the faucet of the present invention can omit the complicated and difficult assembling process, reducing the costs of production and material to render the present invention more competitive on the market.

2. The faucet structure as claimed in claim 1 wherein each coupling end of the connecting tube, having a stop surface defining thereon for the mounting of a sealing ring thereto, is joined to the outlet sleeve of the valve body, and the inner surface of the outlet sleeve has multiple ribs annularly arranged in spacing thereon so that the sealing ring is precisely pressed by the stop surface and restricted in position by the ribs thereof.

3. The faucet structure as claimed in claim 1 wherein the assembly section of the connecting tube has an internal-threaded hole defining one end thereon.

4. The faucet structure as claimed in claim 1 wherein the accommodating tube and the inlet connecting pipe are respectively defined by an external-threaded fixing section and an external-threaded locking section to secure to one locking element having an internal screw-threaded hole defining therein.

5. The faucet structure as claimed in claim 1 wherein the water-flow control valve is made up of a collar with protrusions protruding thereon to mount onto an adjusting element having guide orifices defining thereon, permitting a first limiting plate and a second limiting plate respectively extending at an appropriate position of the collar and the adjusting element thereon to precisely contact and abut against each other thereby; besides, the protrusions of the collar are corresponded to a set of insert grooves cut at the accommodating tube thereon; the adjusting element also has a guide piece with apertures disposed thereon secured at one side to correspond to the guide orifices thereof; the conjoining section of the inlet connecting pipe and the accommodating tube is disposed a port for the accommodation of a flexible watertight ring corresponding to the apertures of the guide piece thereby; a shaft defined by an internal-threaded hole therein is provided extending at one side of the adjusting element thereon.

6. The faucet structure as claimed in claim 1 wherein the handle seat has a positioning groove defining one side therein, and a connection portion, bent in an arched shape, is disposed corresponding to the positioning groove with a guiding hole extending there-through to match to a screw and an ornamental element thereby; the connection portion also has an inner-threaded screw hole indented at one side therein to match to a grip that, ended in a crown-like shape at one side and tapered into a cylindrical configuration at the other thereof, is provided with a fitting hole extending there-through for the mounting of an insert element with an outer-threaded fitting end disposed thereon; the insert element is guided through a watertight O-ring to fix the outer-threaded fitting end to the inner-threaded screw hole of the connection portion thereby.

7. The faucet structure as claimed in claim 1 wherein the handle seat can also have a T-shaped connection portion disposed corresponding to the positioning groove, and a guiding hole is disposed defining the connection portion therein to match to a screw and an ornamental element thereby; besides, an internal-threaded screw hole is disposed defining one end of the connection portion to secure to an external-threaded screw section protruding at one end of a grip wherein the grip is molded in a tapered form with multiple different-angled and diamond-shaped facets cut at the circumferential surface thereon.

8. The faucet structure as claimed in claim 1 wherein the outlet duct can be correspondingly molded to match to the upper and lower housings in shape, and bent into various forms such as a hook-like, a lamp-like, and an inverted pipe-like configurations, etc.

9. The faucet structure as claimed in claim 1 wherein each locating post of the upper housing has an internal-threaded screw hole indented at one end side thereon for the fixing of a screw to secure the upper/lower housings firmly onto the panel thereby.

10. The faucet structure as claimed in claim 1 wherein both ends of the outlet duct are respectively equipped with an external-threaded locking portion, permitting one locking portion to secure to the assembly section of the connecting tube thereof, and the other locking portion thereof to fit to an internal-threaded nozzle and locate onto the conjoining end edge of the upper and lower housings thereof.

* * * * *